US 11,686,276 B2

(12) United States Patent
Dudar

(10) Patent No.: US 11,686,276 B2
(45) Date of Patent: Jun. 27, 2023

(54) METHOD AND SYSTEM FOR DIAGNOSING AN EVAPORATIVE EMISSIONS SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 0 days.

(21) Appl. No.: 17/450,162

(22) Filed: Oct. 6, 2021

(65) Prior Publication Data

US 2023/0109482 A1 Apr. 6, 2023

(51) Int. Cl.
*F02M 25/08* (2006.01)
*F02M 21/04* (2006.01)
*F02D 41/00* (2006.01)

(52) U.S. Cl.
CPC ....... *F02M 25/0818* (2013.01); *F02D 41/003* (2013.01); *F02D 41/0032* (2013.01); *F02M 21/047* (2013.01); *F02M 25/0809* (2013.01); *F02M 25/0827* (2013.01); *F02M 25/0836* (2013.01); *F02M 25/0854* (2013.01)

(58) Field of Classification Search
CPC ............ F02M 25/0818; F02M 21/047; F02M 25/0809; F02M 25/0827; F02M 25/0836; F02M 25/0854; F02D 41/003; F02D 41/0032
See application file for complete search history.

(56) References Cited

U.S. PATENT DOCUMENTS

| | | | | |
|---|---|---|---|---|
| 8,312,765 B2* | 11/2012 | Pursifull | ............ | F02M 25/0809 73/114.39 |
| 9,879,639 B2* | 1/2018 | Dudar | .................... | F01P 11/028 |
| 9,957,924 B2* | 5/2018 | Dudar | ................ | F02M 25/0809 |
| 10,138,827 B2* | 11/2018 | Dudar | .................. | F02D 41/004 |
| 10,760,532 B1* | 9/2020 | Dudar | ................ | F02D 41/0032 |
| 10,815,937 B2* | 10/2020 | Dudar | .................... | F02B 33/34 |
| 10,823,118 B1* | 11/2020 | Dudar | ................ | F02M 25/0827 |
| 2010/0224171 A1* | 9/2010 | Peters | .................. | F02M 25/089 123/520 |
| 2013/0220282 A1* | 8/2013 | Hadre | ................ | F02M 25/0836 123/520 |
| 2016/0305352 A1* | 10/2016 | Pursifull | ............. | F02D 41/0045 |
| 2017/0234269 A1* | 8/2017 | Pursifull | ............. | F02D 41/0032 123/520 |
| 2019/0040823 A1* | 2/2019 | Pursifull | ............ | F02M 25/0836 |
| 2020/0386193 A1* | 12/2020 | Dudar | .................... | F02B 37/18 |

\* cited by examiner

*Primary Examiner* — Hung Q Nguyen
*Assistant Examiner* — Susan E Scharpf
(74) *Attorney, Agent, or Firm* — Vincent Mastrogiacomo; McCoy Russell LLP

(57) ABSTRACT

Methods and systems for diagnosing operation of an evaporative emissions system are described. The methods and systems may include increasing an amount of vacuum stored in an evaporative emissions system during discontinuously operating an engine in a boosted operating mode. Storing vacuum allows the evaporative emissions system to reach a desired vacuum level to verify absence of an evaporative emissions system breech.

16 Claims, 4 Drawing Sheets

METHOD AND SYSTEM FOR DIAGNOSING AN EVAPORATIVE EMISSIONS SYSTEM

FIELD

The present description relates generally to methods and systems for diagnosing operation of an evaporative emissions system.

BACKGROUND/SUMMARY

A vehicle may include an evaporative emissions system for storing and releasing hydrocarbons. The hydrocarbons may be stored in a carbon filled canister and the hydrocarbons may be released into the engine while the engine is running. The evaporative emissions system may operate under vacuum generated by an internal combustion engine. In addition, the evaporative emissions system may operate under vacuum generated via an ejector or venturi. The vacuum may be a motive force for moving the hydrocarbons about the evaporative emissions system. Regulatory agencies may require that the evaporative emissions system is evaluated from time to time to ensure that the evaporative emissions system is operating as expected. The evaluation may require breech testing of evaporative emissions system and testing evaporative emissions system components for functionality.

Evaporative emissions systems of high performance engines may operate a significant portion of their operating time at part load conditions where the high performance engine operates at naturally aspirated conditions. The high performance engine may operate under boosted conditions (e.g., manifold absolute pressure (MAP)>barometric pressure (BP)) for a short period of its operating time. Nevertheless, regulatory agencies may require that the evaporative emissions system is tested under naturally aspirated conditions and boost conditions. Because the high performance engine may operate with boost for short durations, it may be difficult for an evaporative emissions system to be evaluated within a period of time when the engine is operating under boosted conditions. Therefore, it may be desirable to provide a way of evaluating an evaporative emissions system when an engine operates under boost for short intervals.

The inventor herein has recognized the above-mentioned issue and have developed a method for operating an evaporative emissions system of a vehicle, comprising: generating vacuum via an ejector when an engine is operating under boost during a first period; trapping the generated vacuum when the engine does not operate under boost during a second period; and increasing the generated vacuum when the engine operates under boost during a third period.

By storing vacuum in an evaporative emissions system over a series of intervals during which an engine operates in boosted mode, it may be possible to provide the technical result of diagnosing the evaporative emissions system even when the engine operates under boosted operation for short durations. In particular, evaporative emissions system vacuum may stored over a series of short durations where an engine operates in a boosted mode so that an evaporative emissions diagnostic may be performed without having to operate the engine boosted over a long interval to complete the evaporative emissions diagnostic. As such, the engine may operate as expected and the evaporative emissions diagnostic may be performed without altering boosted operation of an engine.

The present description may provide several advantages. In particular, the approach may allow diagnosing operation of an evaporative emissions system without noticeably affecting engine operation. Additionally, the approach may be performed without additional system hardware. Further, the approach may allow diagnostics to be performed on an evaporative emissions system even though the evaporative emissions system is part of a vehicle that includes a high performance engine that may not operate under boost for long periods of time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
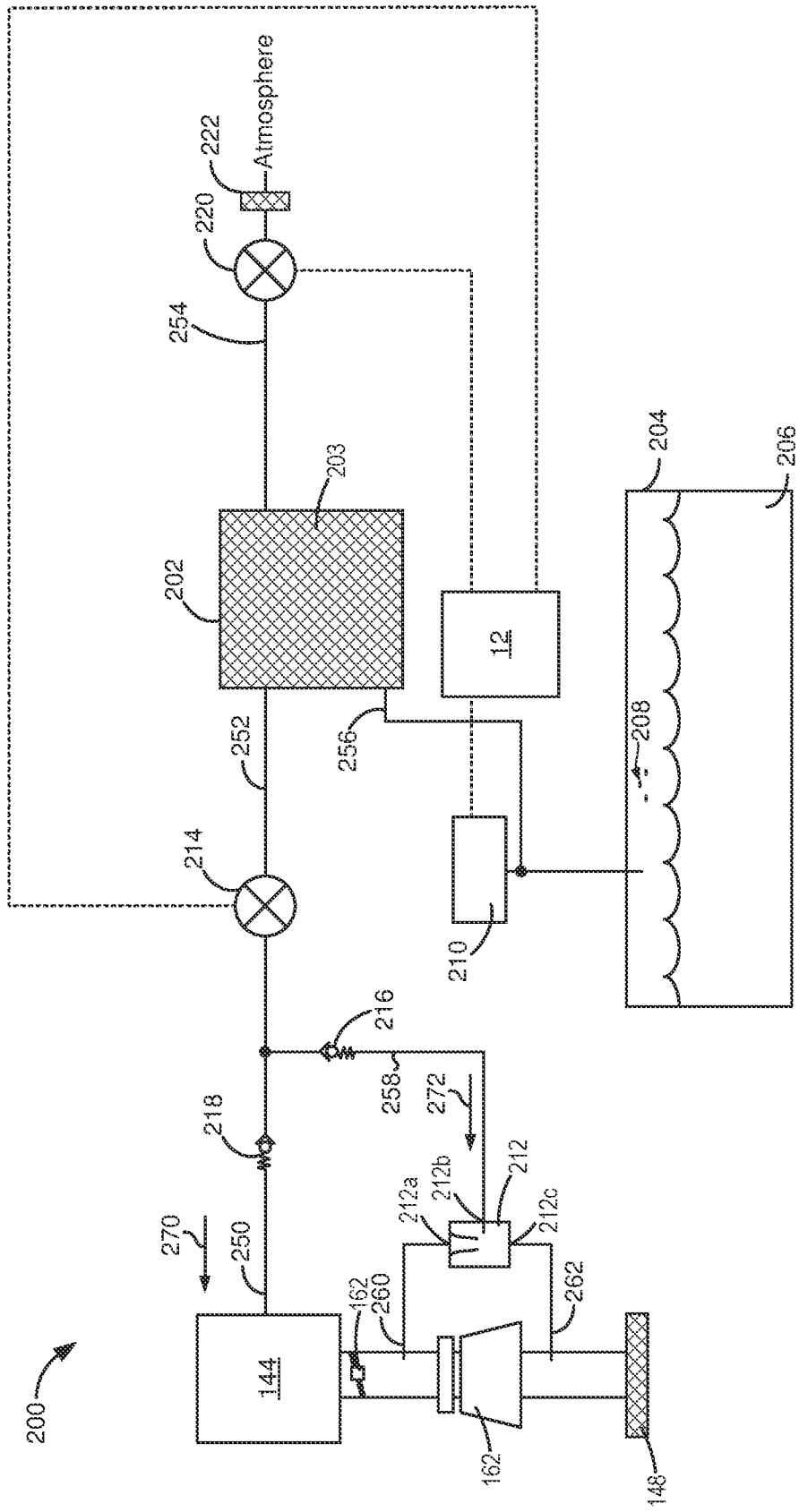
FIG. 2 shows a block diagram of an example evaporative emissions system for the vehicle.
Figure 3:
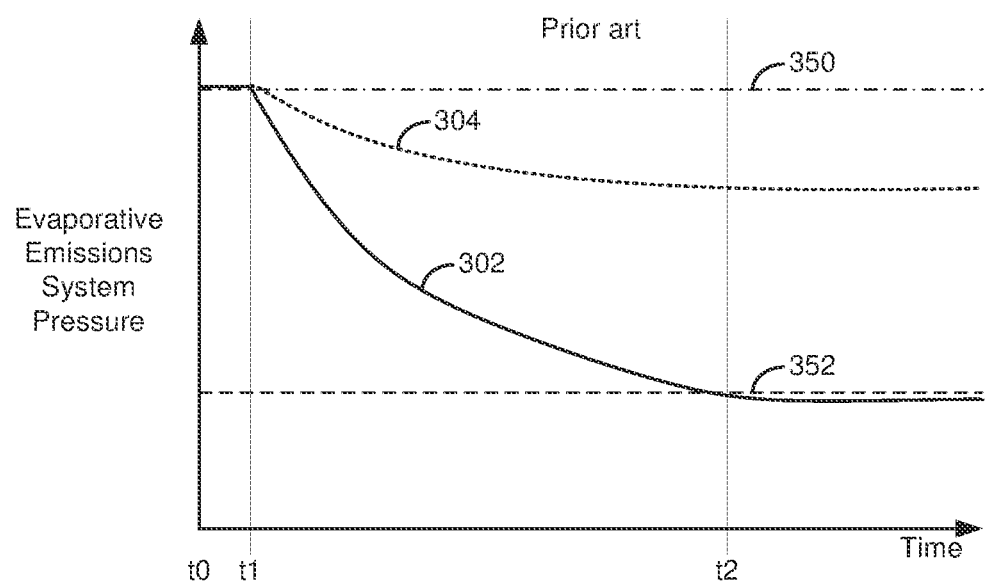
FIG. 3 shows a plot of example pressure in an evaporative emissions system while a prior art diagnostic is being performed on the evaporative emissions system.
Figure 4:
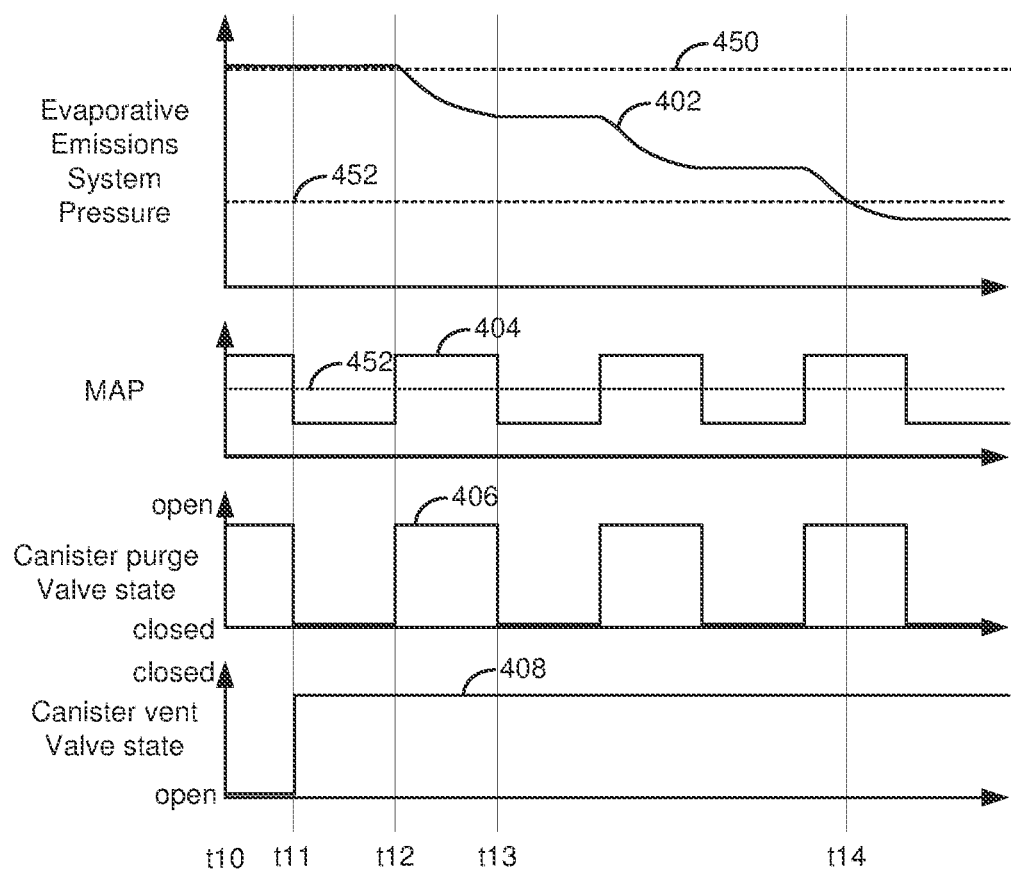
FIG. 4 shows a portion of an example evaporative emissions system diagnostic procedure.

The following description relates to systems and methods for diagnosing an evaporative emissions system of a boosted engine. The boosted engine may be a high performance engine or an engine that is operated for short durations at high loads. The system and method may enable lower pressures or higher vacuum levels to be generated in an evaporative emissions system so that the evaporative emissions system may be evaluated under conditions where smaller breeches may be detected. The evaporative emissions system may be coupled to an engine of the type shown in FIG. 1. The evaporative emissions system may be configured as shown in FIG. 2. Evaporative emissions system pressure during a prior art evaporative emission diagnostic is shown in FIG. 3. The evaporative emissions system may be operated as shown in FIG. 4 according to the method of FIG. 5.

Figure 1:
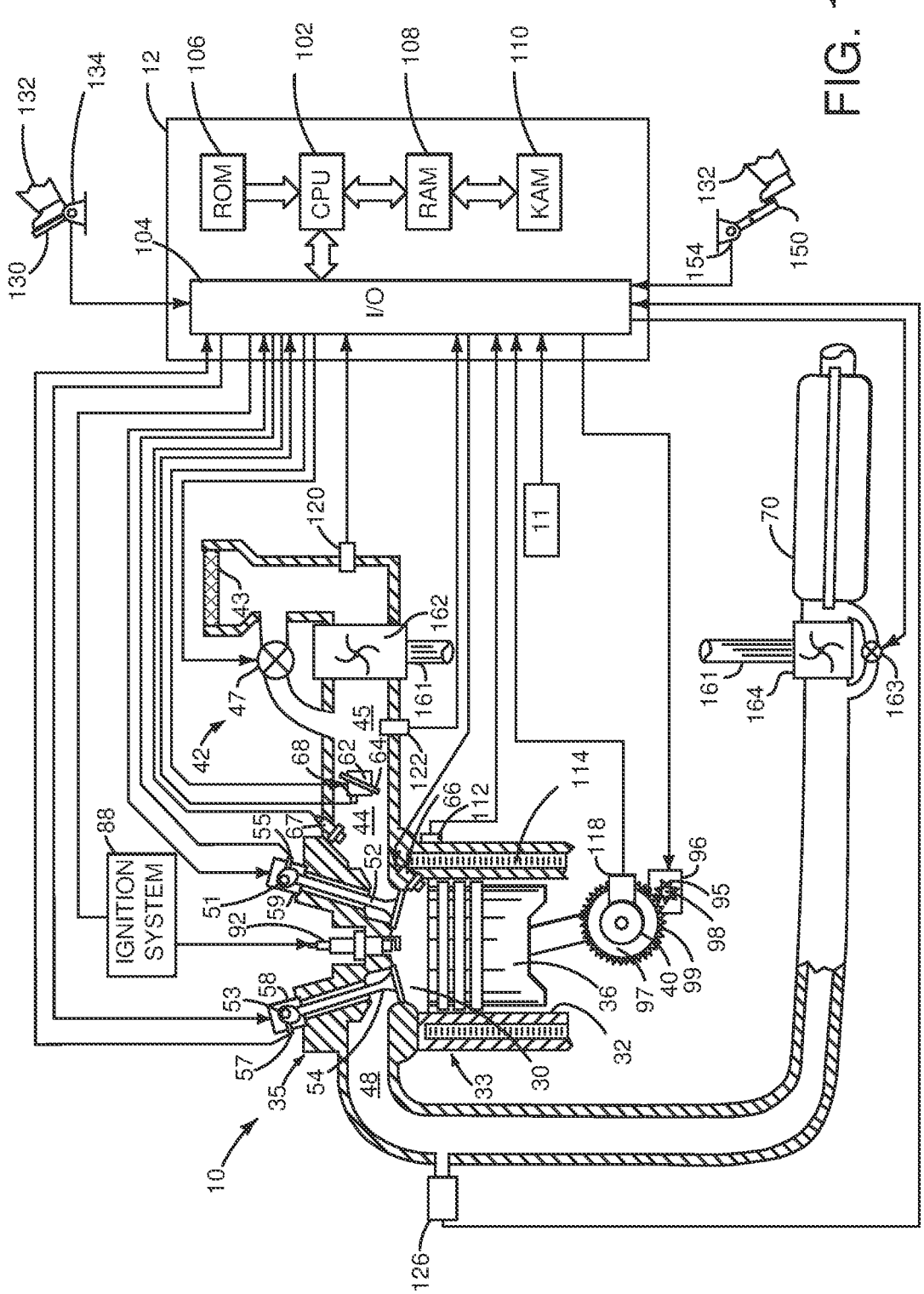
FIG. 1 shows an example internal combustion engine of a vehicle.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of an evaporative emissions system 200 is shown. The evaporative emissions system of FIG. 2 may be coupled to the engine of FIG. 1. In addition, the evaporative emissions system of FIG. 2 may be operated according to the method of FIG. 5 to provide the operating sequences shown in FIGS. 3 and 4. In FIG. 2, electrical connections are shown as dashed lines.

Evaporative emissions system 200 includes a carbon filled canister 202 that includes activated charcoal or carbon 203.

The carbon filled canister 202 may be selectively coupled to atmosphere via conduit 254, canister vent valve (CVV) 220, and dust box 222. Carbon filled canister 202 may also be coupled to fuel tank 204 via conduit 256. Fuel tank 204 may include a mixture of liquid fuel 206 and fuel vapors 208. Fuel tank pressure sensor 210 may sense a pressure in fuel tank 204 and in the evaporative emissions system 200. In addition, carbon filled canister 202 may be coupled to a canister purge valve 214 via conduit 252. Canister purge valve 214 is coupled to engine intake manifold 144 via conduit 250. Conduit 250 may include a check valve 218 that prevents flow from intake manifold 144 to canister purge valve 214, but permits flow from canister purge valve 214 to intake manifold 144. Canister purge valve 214 is also coupled to ejector 212 via conduit 258. Conduit 258 may include a check valve 216 that prevents flow from ejector 212 to canister purge valve 214, but permits flow from canister purge valve 214 to ejector 212. Ejector 212 may generate a low pressure at suction port 212b when air flows from compressor 162 to motive fluid port 212a. Air may flow into ejector 212 from carbon filled canister 202, fuel tank 204, and the various conduits of evaporative emissions system 200 when engine 10 is operating under boost while CPV 214 and CVV 220 are open. Air may into ejector 212 in the direction of arrow 272. Air from compressor 162 and air from conduit 250 may flow out of ejector outlet 262 and into compressor 162. Controller 12 may operate canister purge valve 214 and canister vent valve 220 responsive to output of pressure sensor 210.

Carbon filled canister 202 may be purged of hydrocarbons via opening canister purge valve 214 and opening canister vent valve 220 when engine 10 is rotating and combusting air and fuel. Fuel vapors may flow into intake manifold 144 in the direction of arrow 270 when engine 10 is operating in a naturally aspirated mode or in a non-boost mode while CPV 214 and CVV 220 are open. Fuel vapors may flow into intake manifold 144 in the direction of arrow 212 when engine 10 is operating in a boosted mode.

Thus, the system of FIGS. 1 and 2 provides for a vehicle system, comprising: an engine including a compressor; an evaporative emissions system including an ejector; and a controller including executable instructions stored in non-transitory memory that cause the controller to accumulate a vacuum in the evaporative emissions system during conditions where the engine switches from boosted operation to non-boosted operation, the vacuum accumulated only during conditions when the engine is operated boosted. The vehicle system includes where the vacuum is generated via the ejector when the engine is operated boosted. The vehicle system further comprises a canister vent valve, a canister purge valve, and additional instructions to close the canister purge valve and open the canister vent valve in response to a request for an evaporative emissions system diagnostic when the engine is operating boosted. The vehicle system further comprises additional instructions to close the canister purge valve and close the canister vent valve in response to the request for the evaporative emissions system diagnostic when the engine is operating non-boosted. The vehicle system further comprises additional instructions to indicate degradation of the evaporative emissions system in response to the vacuum being less than a threshold amount of vacuum after a predetermined amount of time operating the engine in boosted operation. The vehicle system further comprises additional instructions to indicate an absence of degradation of the evaporative emissions system in response to the vacuum being greater than a threshold amount of vacuum. The vehicle system further comprises a carbon filled canister and additional instructions to purge the carbon filled canister of fuel vapors before accumulating the vacuum. The vehicle system includes where the carbon filled canister is purged of fuel vapors while the engine operates boosted or non-boosted.

Referring now to FIG. 3, a plot of a prior art diagnostic sequence for an evaporative emissions system is shown. The vertical axis represents pressure in an evaporative emissions system and pressure increases in the direction of the vertical axis arrow. The horizontal axis represents time and time increases from the left side of the figure to the right side of the figure. Horizontal line 350 represents barometric pressure and horizontal line 352 represents a minimum vacuum level in the evaporative emissions system when the evaporative emissions system is undergoing a vacuum breech test. Line 302 represents pressure in the evaporative emissions system when a breech is not present in the evaporative emissions system and line 304 represents pressure in the evaporative emissions system when a small breech is present in the evaporative emissions system.

At time t0, the evaporative emissions system is not undergoing a diagnostic and pressure within the evaporative emissions system is equal to barometric pressure. At time t1, a vacuum decay breech test begins and air is drawn from the evaporative emissions system into the engine via low intake manifold pressure. Pressure in the evaporative emissions system having the small breech (line 304) drops at a lower rate than pressure in the evaporative emissions system that does not have the small breach (line 302). Between time t1 and time t2, pressure in the system with the small breech remains above threshold 350. However, pressure in the system having no breech declines to a level that is below threshold 350. At time t2, pressure in the evaporative emission systems is evaluated. The pressure of curve 302 is less than threshold 350 so the evaporative emissions system that has the pressure that is represented by curve 302 is indicated as operating as expected. The pressure of curve 304 is greater than threshold 350 so the evaporative emissions system that has the pressure that is represented by curve 304 is indicated as being degraded. The evaporative emissions system represented by curve 302 is continuously exposed to intake manifold pressure between time t1 and time t2. Accordingly, the pressure that is represented by curve 302 decays continuously from time t1 to time t2.

Figure 5:
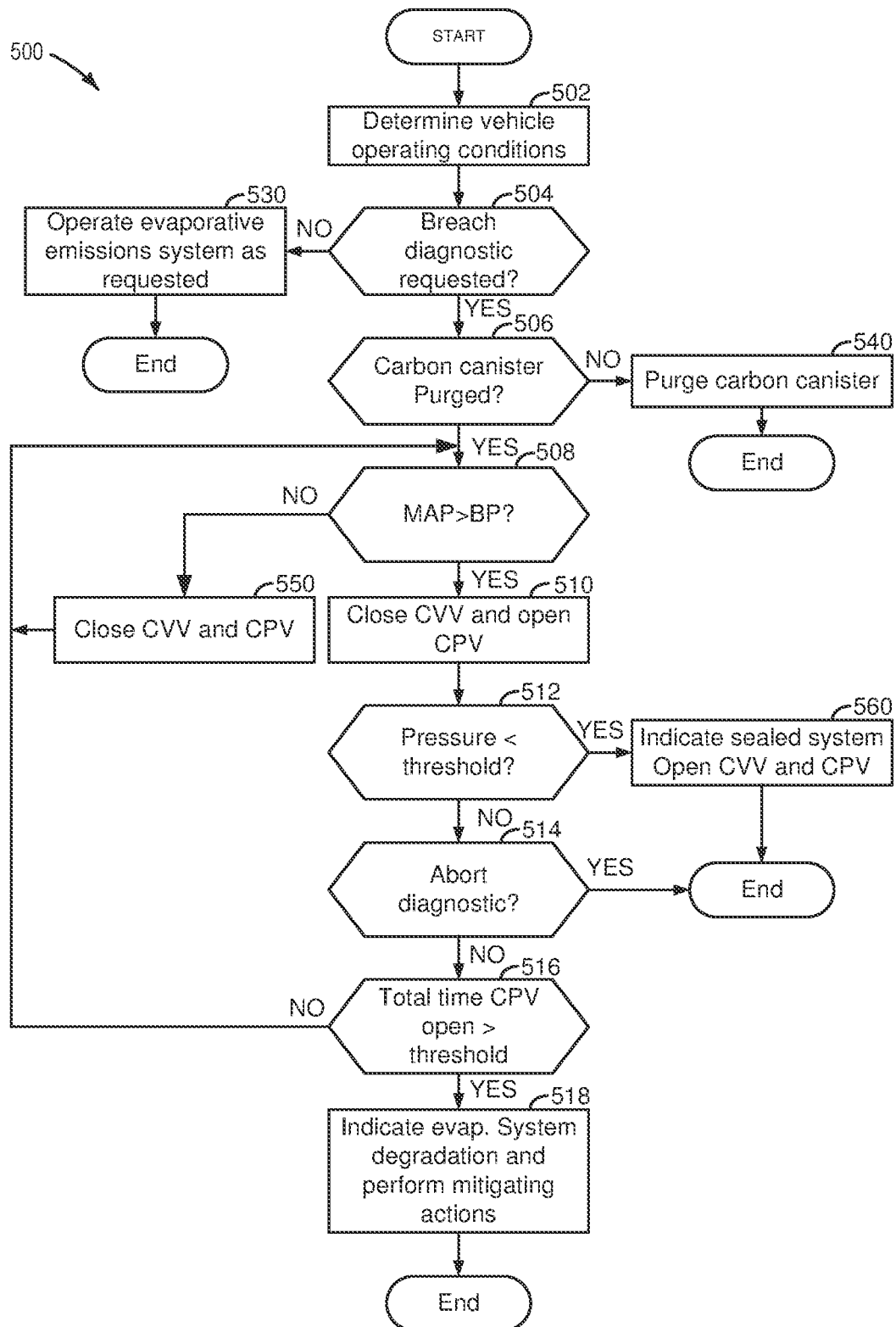
FIG. 5 shows an example method for diagnosing operation of an evaporative emissions system for a vehicle.

Referring now to FIG. 4, a prophetic evaporative emissions system diagnostic according to the method of FIG. 5 is shown. FIG. 4 includes four plots and the plots are based on data that occurs at the same time and that is time aligned. The sequence of FIG. 4 may be provided by the system of FIGS. 1 and 2 in cooperation with the method of FIG. 5. The vertical lines at times t10-t14 represent times of interest during the sequence.

The first plot from the top of FIG. 4 is a plot of an amount of pressure in an evaporative emissions system versus time. The vertical axis represents the amount of pressure in an evaporative emissions system and the amount of pressure in the evaporative emissions system increases in the direction of the vertical axis arrow. The horizontal axis represents time and time increases in the direction of the horizontal axis arrow. Trace 402 represents the amount of pressure in an evaporative emissions system. Line 450 represents barometric pressure and line 452 represents a threshold pressure to pass an evaporative emissions system diagnostic. An evaporative emissions system diagnostic may pass when the pressure that is represented by trace 402 is lower than threshold 452.

The second plot from the top of FIG. 4 is a plot of manifold absolute pressure (MAP) versus time. The vertical axis represents MAP and MAP increases in the direction of the vertical axis arrow. The horizontal axis represents time and time increases in the direction of the horizontal axis arrow. Horizontal line 452 represents barometric pressure. Trace 404 represents MAP.

The third plot from the top of FIG. 4 is a plot of a state of the canister purge valve (CPV) versus time. The vertical axis represents the CPV state and the CPV is fully open when trace 406 is at a higher level near the vertical axis arrow. The CPV is fully closed when trace 406 is at a lower level near the horizontal axis. Trace 406 represents the CPV operating state.

The fourth plot from the top of FIG. 4 is a plot of the canister vent valve (CVV) operating state versus time. The vertical axis represents the CVV state and the CVV is fully open when trace 408 is at a level of the horizontal axis. The CVV is fully closed when trace 408 is at a higher level near the vertical axis arrow. Trace 408 represents the CVV state.

At time t10, the evaporative emissions system pressure is equal to barometric pressure and MAP is greater than barometric pressure, which indicates that the engine is operating under boost (e.g., is being supplied with pressurized air). The CPV is open and the CVV is open. During these conditions, fuel vapors may be drawn from the carbon filled canister to the engine via an ejector.

At time t11, an evaporative emissions system diagnostic is requested and the CVV is closed to prevent communication with atmosphere. In addition, the CPV is closed. Closing the CVV and CPV seals the evaporative emissions system from atmospheric pressure and pressure in the engine or at the ejector when the evaporative emissions system is free of breeches. The engine switches from operating with MAP greater than BP to operating the engine with MAP less than barometric pressure (BP). In other words, the engine begins operating in a non-boosted mode. The engine may switch from operating with MAP greater than BP to operating with MAP less than BP in response to a change in driver demand (not shown). Pressure in the evaporative emissions system remains at barometric pressure.

At time t12, the engine switches from operating with MAP less than BP to operating the engine with MAP greater than BP. In other words, the engine begins operating in a boosted operating mode. While operating in boosted mode, the ejector is activated by opening the CPV. The ejector begins drawing air from the evaporative emissions system into the ejector when the CPV is opened. The CVV remains closed so that air may not flow into the evaporative emissions system. Evaporative emissions system pressure drops as air is drawn from the evaporative emissions system via the ejector.

At time t13, the engine switches from operating with MAP greater than BP to operating the engine with MAP less than BP. The CPV is closed to prevent air flow into the evaporative emissions system. Closing the CPV prevents air from being drawn from the evaporative emissions system to the ejector. As a result, evaporative emissions system pressure ceases decreasing and it remains at a constant level. The CVV remains closed so that air may not flow into the evaporative emissions system. The MAP cycles above and below BP several times between time t13 and time t14.

At time t14, pressure in the evaporative emissions system is reduced to less than threshold 452. The evaporative emissions system is determined not to be degraded when the evaporative emissions system pressure is reduced to less than threshold 452. Thus, even though MAP rises above BP and falls below BP, the evaporative emissions system diagnostic need not abort. Further, the pressure stored in the evaporative emissions system allows the diagnostic to complete sooner as compared to if the diagnostic restarted every time MAP rose above BP. In this way, pressure may be conserved to reduce an amount of time to perform a diagnostic and to reflect the integrity of the evaporative emissions system.

In this way, an evaporative emissions system diagnostic may be completed for conditions where an engine changes between boosted and non-boosted modes. Pressure in the evaporative emissions system may be conserved so that an evaluation of the ejector and evaporative emissions system complete even though the ejector operates discontinuously during the evaporative emissions system diagnostic.

Referring now to FIG. 5, an example method 500 for operating an evaporative emission system is shown. In particular, the method may diagnose the presence or absence of a breech of an evaporative emissions system according to a pressure in the evaporative emissions system. At least portions of method 500 may be included in and cooperate with a system as shown in FIGS. 1 and 2 as executable instructions stored in non-transitory memory. The method of FIG. 5 may cause the controller to adjust the actuators in the real world and receive data and signals from sensors described herein when the method is realized via executable instructions stored in controller memory.

At 502, method 500 determines vehicle operating conditions. Vehicle operating conditions may include but are not limited to ambient air temperature, engine speed, engine air flow amount, driver demand torque or power, intake manifold pressure, spark timing, barometric pressure, intake inlet pressure, fuel tank pressure, carbon filled canister hydrocarbon loads, and engine air-fuel ratio. Method 500 may determine or infer these conditions from the various sensors mentioned herein. Method 500 proceeds to 504.

At 504, method 500 judges if an evaporative emissions system breech diagnostic is to be performed. An evaporative emissions system breech diagnostic may be performed each time the vehicle travels a predetermined distance or operates for a predetermined amount of time. If method 500 judges that an evaporative emissions system breech diagnostic is to be performed, the answer is yes and method 500 proceeds to 506. Otherwise, the answer is no and method 500 proceeds to 530.

At 530, method 500 operates the evaporative emissions system as has been requested. For example, method 500 may purge hydrocarbons from the carbon filled canister via opening the CVV and opening the CPV. Alternatively, if the carbon filled canister has been purged of fuel vapors, method 500 may close the CPV and allow air to enter the fuel tank or allow air to exit the evaporative emissions system. Method 500 proceeds to exit.

At 506, method 500 judges if the carbon filled canister has been purged of fuel vapors. If so, the answer is yes and method 500 proceeds to 508. Otherwise, the answer is no and method 500 proceeds to 540. Method 500 may judge if the carbon filled canister has been purged of fuel vapors so that purging of fuel vapors may not be required while the evaporative emissions system diagnostic is being performed.

At 540, method 500 may purge fuel vapors from the carbon filled canister. Method 500 may purge fuel vapors from the carbon filled canister via intake manifold pressure by opening the CPV and opening the CVV when the engine is operated in a naturally aspirated or non-boosted mode. Method 500 may purge fuel vapors from the carbon filled canister via an injector by opening the CPV and opening the CVV when the engine is operated in a boost mode. Method 500 proceeds to exit.

At 508, method 500 judges if MAP is greater than BP. If so, the answer is yes and method 500 proceeds to 510. Otherwise, the answer is no and method 500 proceeds to 550. If MAP is greater than BP, the engine is operating in boost mode. If MAP is less than BP, the engine is operating in a naturally aspirated mode or non-boost mode.

At 510, method 500 fully closes the CVV and fully opens the CPV. Method 500 proceeds to 512. Closing the CVV and opening the CPV allows the ejector to draw air from the evaporative emissions system including the carbon filled canister, conduits, and fuel tank.

At 550, method 500 closes the CVV and closes the CPV. Closing the CVV and closing the CPV may trap vacuum in the evaporative emissions system. However, if there is a breech in the evaporative emissions system, vacuum in the evaporative emissions system may be lost or reduced. Method 500 returns to 508.

At 512, method 500 judges if pressure in the evaporative emissions system is less than a threshold pressure. The threshold pressure may be a vacuum level that is indicative of the ejector drawing air from the evaporative emissions system for a threshold amount of time. If method 500 judges that pressure in the evaporative emissions system is less than the threshold, the answer is yes and method 500 proceeds to 560. Otherwise, the answer is no and method 500 proceeds to 514.

At 560, method 500 indicates that the evaporative emissions system is a sealed system and has passed the diagnostic. Method 500 may also open the CVV and the CPV to purge any fuel vapors that may have collected in the carbon filled canister. Method 500 proceeds to exit.

At 514, method 500 judges if it may be desirable to abort the evaporative emissions system diagnostic. In one example, method 500 may judge to abort the evaporative emissions diagnostic if pressure in the evaporative emissions system has increased after the engine has been operating in a boost mode for a threshold amount of time. The increasing pressure may be indicative of fuel vapors being generated in the fuel tank due to higher ambient temperatures and/or fuel tank agitation. If method 500 judges to abort the evaporative emissions diagnostic, method 500 opens the CVV and CPV and proceeds to exit. Otherwise, the answer is no and method 500 proceeds to 516.

At 516, method 500 judges if the total amount of time that the CPV has been held open since a beginning of the diagnostic is greater than a threshold amount of time. The total amount of time may be accumulated over several times that the CPV was opened after the diagnostic had started. For example, the total amount of time that the CPV is open during an evaporative emissions system diagnostic may include the CPV being open for five seconds beginning at the time the evaporative emissions diagnostic started, being open for thirty seconds after closing the CPV a first time during the evaporative emissions, being open for twenty seconds after closing the CPV a second time during the evaporative emissions diagnostic, and being open for forty five seconds after closing the CPV a third time during the evaporative emissions diagnostic. If method 500 judges that the total amount of time that the CPV has been held open after beginning the most recent evaporative emissions system diagnostic is greater than a threshold amount of time, the answer is yes and method 500 proceeds to 518. Otherwise, the answer is no and method 500 returns to 508.

At 518, method 500 indicates that the evaporative emissions system is degraded (e.g., a breech is present in the evaporative emissions system or the ejector is not performing as expected). Method 500 may indicate the evaporative emissions system is degraded via displaying a message on a human/machine interface. In addition, method 500 may perform mitigating actions. For example, method 500 may purge the carbon filled canister more frequently to reduce a possibility of hydrocarbons being released from the carbon filled canister. Method 500 proceeds to exit.

In this way, vacuum or a low pressure may be stored in an evaporative emissions system. The vacuum or low pressure that is stored may be generated solely via an ejector even though the engine enters boosted and non-boosted modes during an evaporative emissions system diagnostic.

Thus, the method of FIG. 5 provides for a method for operating an evaporative emissions system of a vehicle, comprising: generating vacuum via an ejector when an engine is operating under boost during a first period; trapping the generated vacuum when the engine does not operate under boost during a second period; and increasing the generated vacuum when the engine operates under boost during a third period. The method includes where the second period is between the first period and the third period. The method includes where generating vacuum includes generating vacuum via an ejector. The method further comprises supplying pressurized air to the ejector via a compressor. The method includes where the generated vacuum is trapped via a closed canister vent valve and a closed canister purge valve. The method includes where the generated vacuum is trapped in a fuel tank and a carbon filled canister. The method further comprises purging fuel vapors from a carbon filled canister before trapping the generated vacuum.

The method of FIG. 5 also provides for a method for operating an evaporative emissions system of a vehicle, comprising: increasing an amount of vacuum in the evaporative emissions system via only an ejector during conditions when an engine switches between boosted operation and non-boosted operation in response to an evaporative emissions diagnostic request. The method further comprises closing a canister vent valve in response to the evaporative emissions diagnostic request. The method further comprises opening and closing a canister purge valve while an evaporative emissions diagnostic is being performed. The method includes where the canister purge valve is opened in response to engine intake manifold pressure being greater than barometric pressure. The method includes where the canister purge valve is closed in response to engine intake manifold pressure being less than barometric pressure.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an evaporative emissions system of a vehicle in response to an evaporative emissions diagnostic request, comprising:
generating vacuum via an ejector when an engine is operating under boost during a first period;
trapping the generated vacuum when the engine does not operate under boost during a second period subsequent to the first period;
increasing the generated vacuum when the engine operates under boost during a third period subsequent to the second period; and
determining a result of the diagnostic subsequent to the third period,
where the generated vacuum is a first amount in the first period and the generated vacuum is increased to a second amount during the third period, and the second amount is greater than the first amount.

2. The method of claim 1, where the generating vacuum includes generating vacuum via an ejector by supplying pressurized air to the ejector via a compressor.

3. The method of claim 1, where the generated vacuum is trapped in a fuel tank and a carbon filled canister and trapped via a closed canister vent valve and a closed canister purge valve.

4. The method of claim 1, further comprising purging fuel vapors from a carbon filled canister before trapping the generated vacuum.

5. A method for operating an evaporative emissions system of a vehicle in response to an evaporative emissions diagnostic request, comprising:
increasing an amount of vacuum in the evaporative emissions system during a first boosted operation,
closing a valve to maintain evaporative emissions system pressure during a first non-boosted operation subsequent to the first boosted operation, and
increasing the amount of vacuum in the evaporative emissions system during a second boosted operation subsequent to the first non-boosted operation,
where the increasing of the amount of vacuum uses an ejector and the first boosted operation increases an amount of vacuum to a first amount and the second boosted operation increases the amount of vacuum from the first amount to a second amount.

6. The method of claim 5, further comprising closing a canister vent valve in response to the evaporative emissions diagnostic request.

7. The method of claim 5, where the valve is a canister purge valve and the canister purge valve is open during increasing of the amount of vacuum.

8. The method of claim 7, where the canister purge valve is opened in response to engine intake manifold pressure being greater than barometric pressure.

9. The method of claim 8, where the canister purge valve is closed in response to engine intake manifold pressure being less than barometric pressure.

10. The method of claim 5, where a canister vent valve is closed during both boosted operation and non-boosted operation, the valve is a canister purge valve, and the canister purge valve is opened during increasing of the amount of vacuum and closed during non-boosted operation to seal the evaporative emissions system.

11. The method of claim 5, further comprising indicating that the evaporative emissions system has passed the diagnostic if the evaporative emissions system pressure reaches a threshold.

12. The method of claim 5, further comprising indicating that the evaporative emissions system has passed the diagnostic if the evaporative emissions system pressure reaches a threshold, and
indicating that the evaporative emissions system has failed the diagnostic if the evaporative emissions system pressure fails to reach the threshold after a threshold time in boosted operation.

13. The method of claim 5, where the increasing the amount of vacuum includes generating vacuum via the ejector by supplying pressurized air to the ejector via a compressor.

14. The method of claim 5, where closing the valve to maintain evaporative emissions system pressure traps pressure in a fuel tank and a carbon filled canister.

15. The method of claim 5, where closing the valve comprises closing a canister vent valve and a canister purge valve.

16. The method of claim 5, further comprising purging fuel vapors from a carbon filled canister before trapping the generated vacuum.

* * * * *